(No Model.)

G. F. McCOMBS.
BROOM SEWING MACHINE.

No. 338,999. Patented Mar. 30, 1886.

(No Model.) 6 Sheets—Sheet 2.
G. F. McCOMBS.
BROOM SEWING MACHINE.
No. 338,999. Patented Mar. 30, 1886.
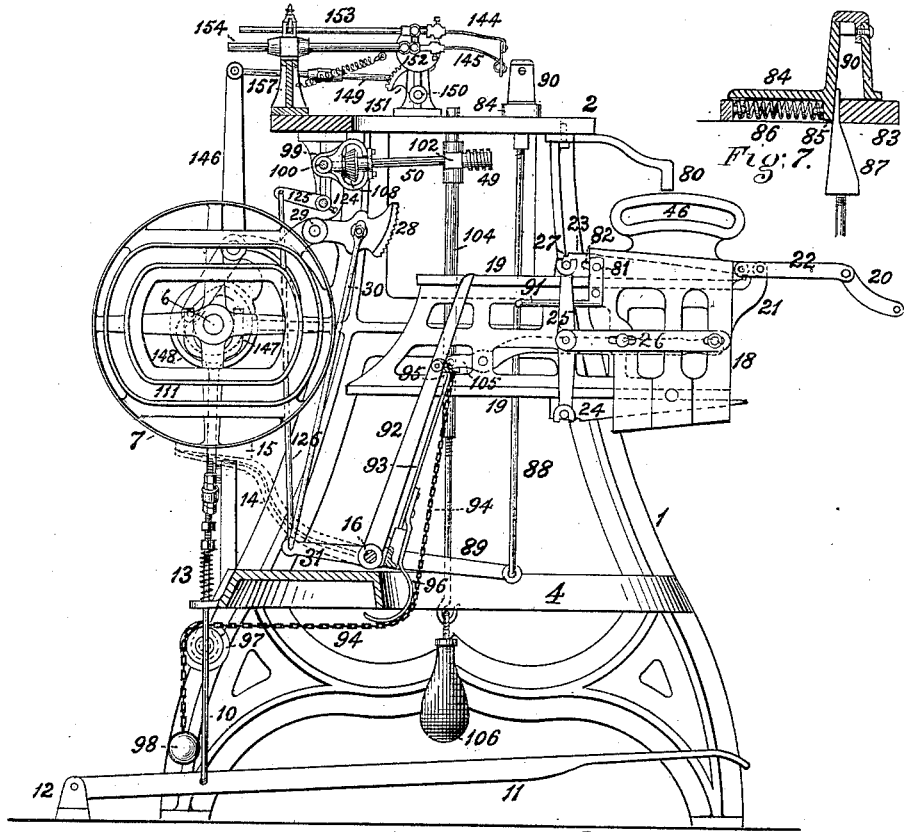
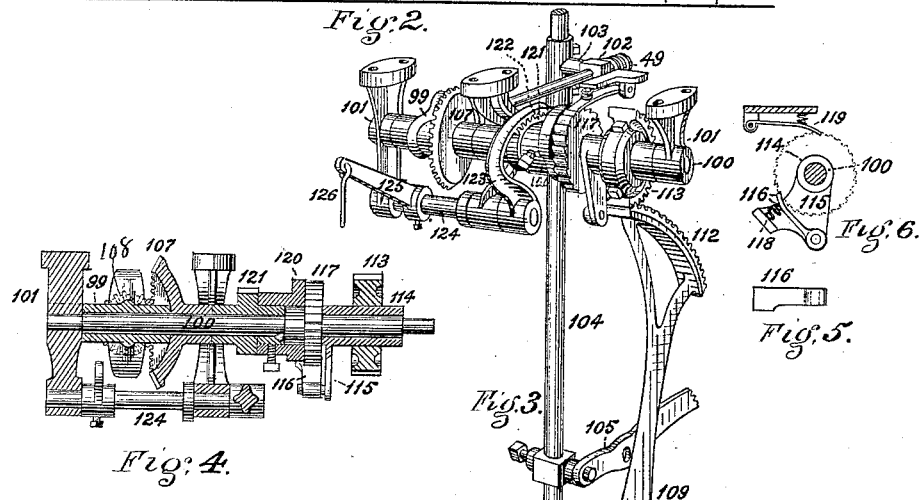
Witnesses
J. Snowden Bell
O. M. Clarke
Inventor
George F. McCombs,
By Attorney
George H. Christy (No Model.) 6 Sheets—Sheet 3.

G. F. McCOMBS.

BROOM SEWING MACHINE.

No. 338,999. Patented Mar. 30, 1886.

Witnesses
J. Thornden Bell.
C. M. Clarke.

Inventor George F. McCombs,
By Attorney George H. Christy (No Model.) 6 Sheets—Sheet 4.
G. F. McCOMBS.
BROOM SEWING MACHINE.
No. 338,999. Patented Mar. 30, 1886.
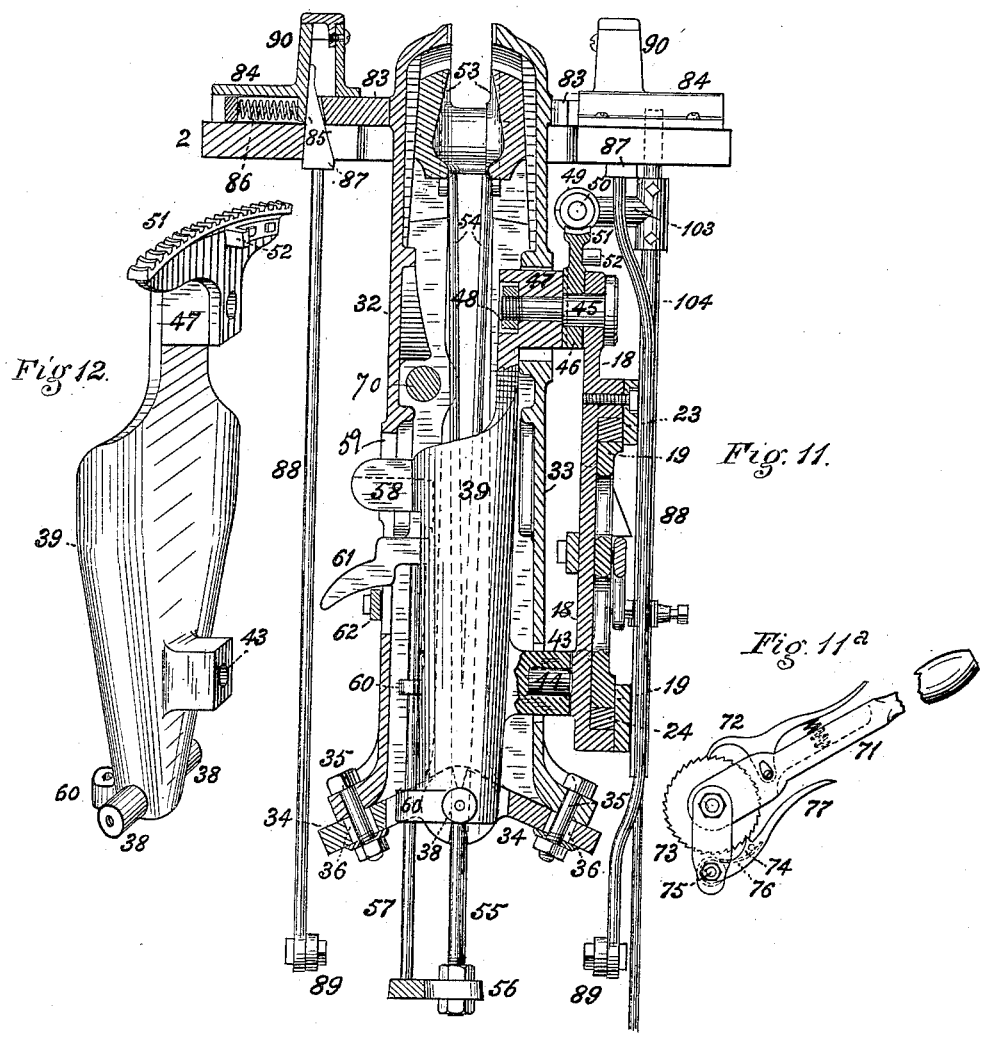
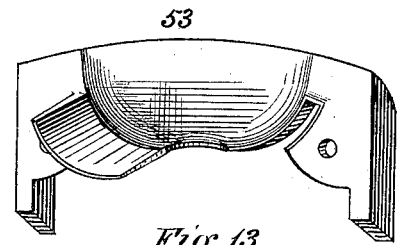
Fig. 13.
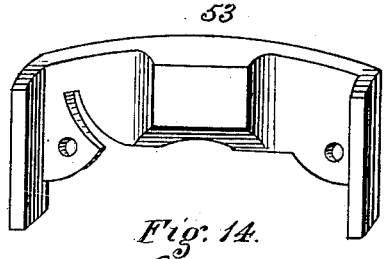
Fig. 14.
Witnesses
Inventor George F. McCombs,
By Attorney George H. Christy (No Model.) 6 Sheets—Sheet 5.
G. F. McCOMBS.
BROOM SEWING MACHINE.
No. 338,999. Patented Mar. 30, 1886.
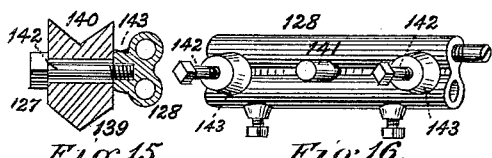
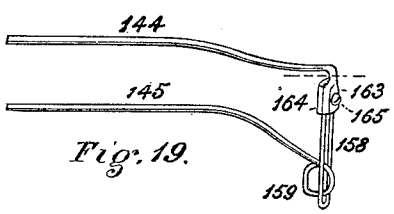
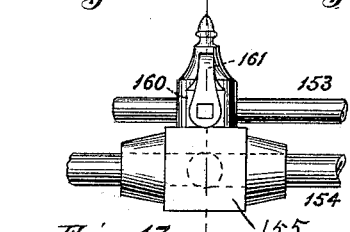
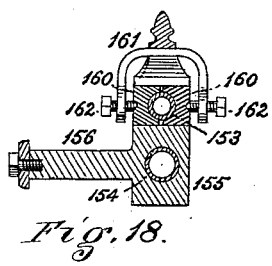
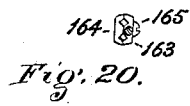
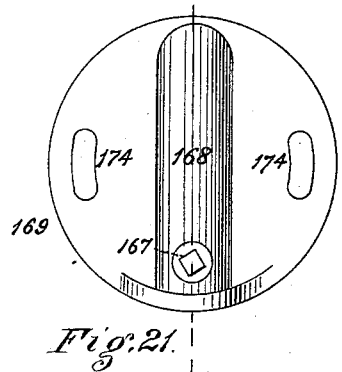
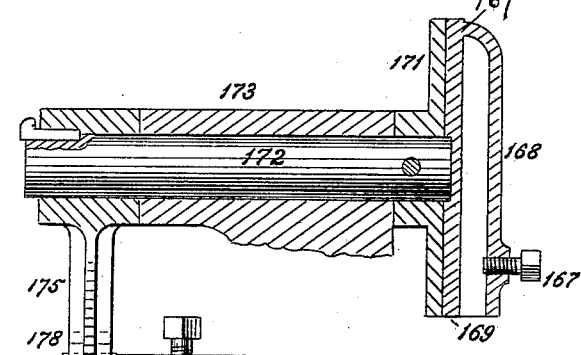
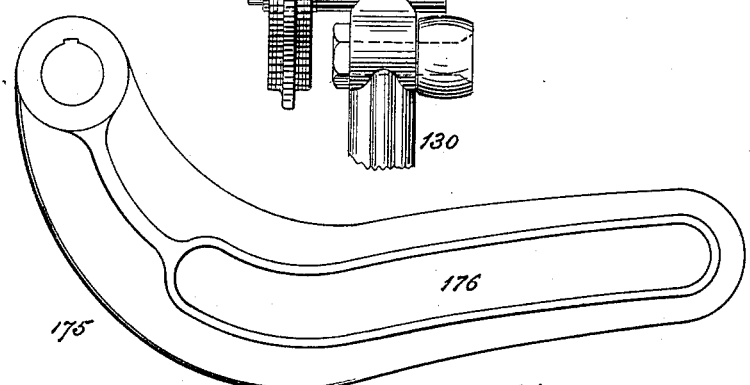
Witnesses
J. Snowden Bell
C. M. Clarke
Inventor George F. McCombs,
By Attorney George H. Christy (No Model.) 6 Sheets—Sheet 6.
G. F. McCOMBS.
BROOM SEWING MACHINE.
No. 338,999. Patented Mar. 30, 1886.
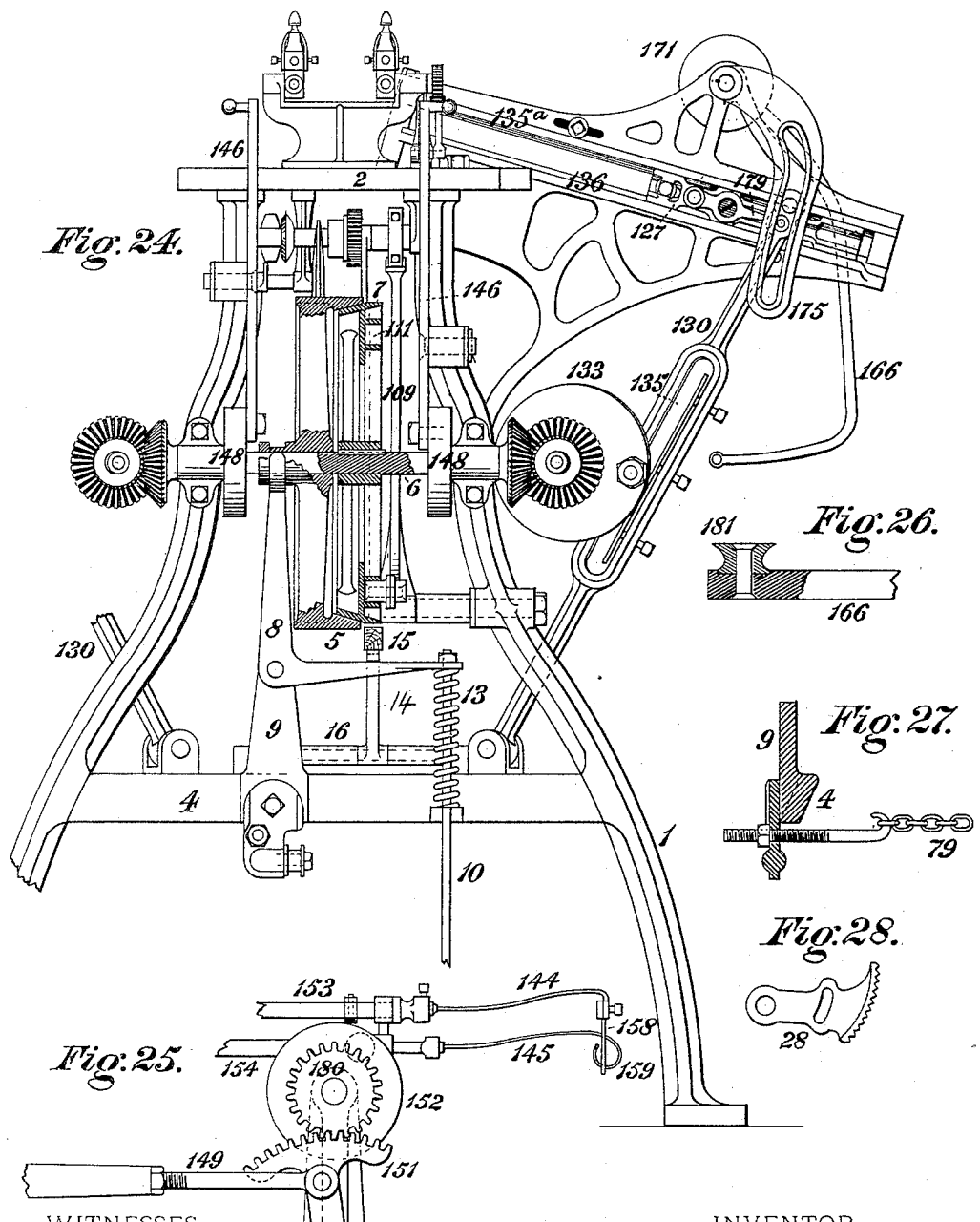
INVENTOR,
George F. McCombs.
BY George H. Christy
ATTORNEY.
WITNESSES:
J. Snowden Bell
C. M. Clarke

UNITED STATES PATENT OFFICE.

GEORGE F. McCOMBS, OF ALLEGHENY, ASSIGNOR TO THE HAND STITCH BROOM SEWING MACHINE COMPANY, (LIMITED,) OF PITTSBURG, PA.

BROOM-SEWING MACHINE.

SPECIFICATION forming part of Letters Patent No. 338,999, dated March 30, 1886.

Application filed September 13, 1884. Serial No. 142,957. (No model.)

*To all whom it may concern:*

Be it known that I, GEORGE F. McCOMBS, a citizen of the United States, residing at Allegheny, in the county of Allegheny and State of Pennsylvania, have invented or discovered certain new and useful Improvements in Broom-Sewing Machines, of which improvement the following is a specification.

Figure 1:
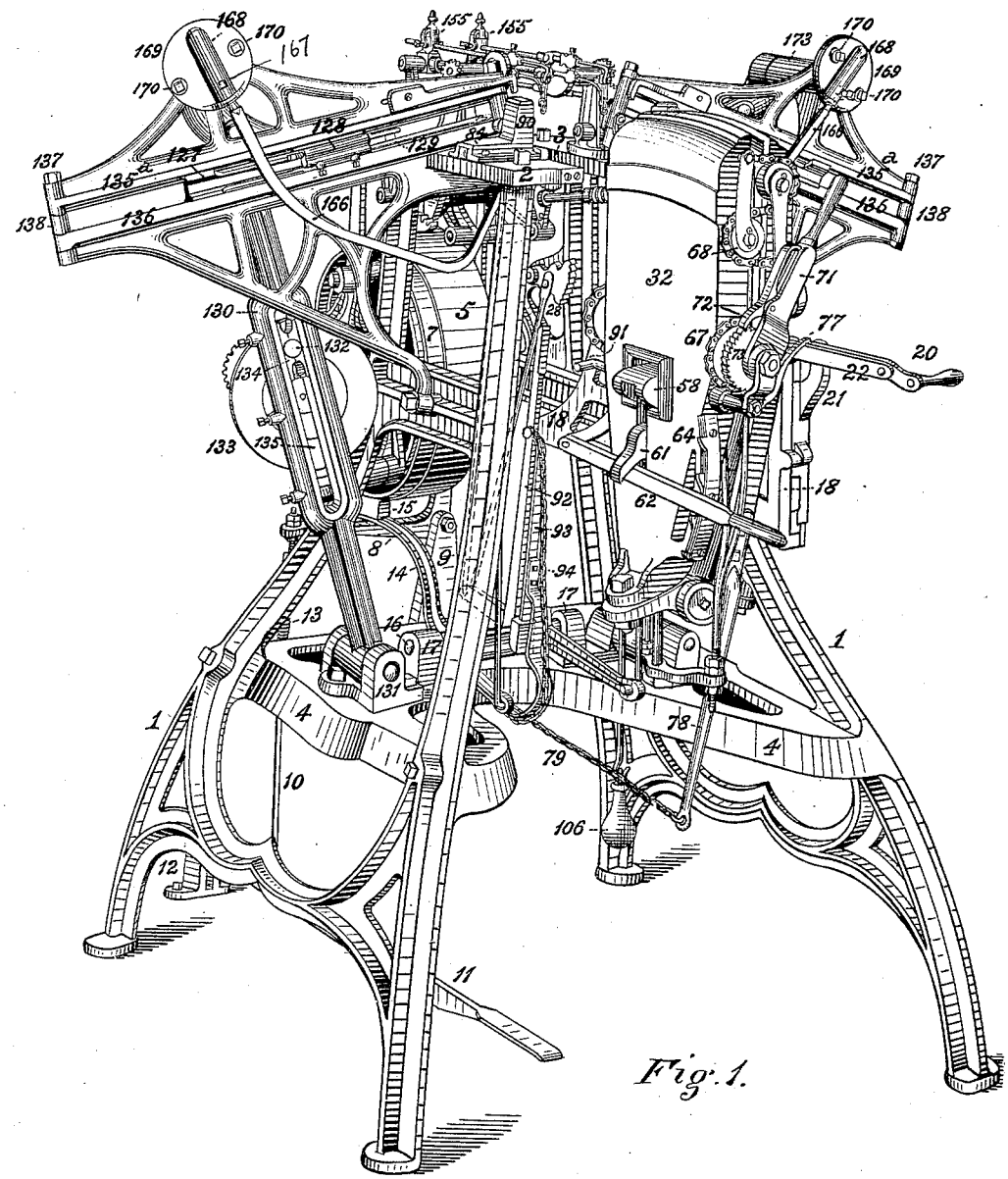
Figures 8, 9, 10:
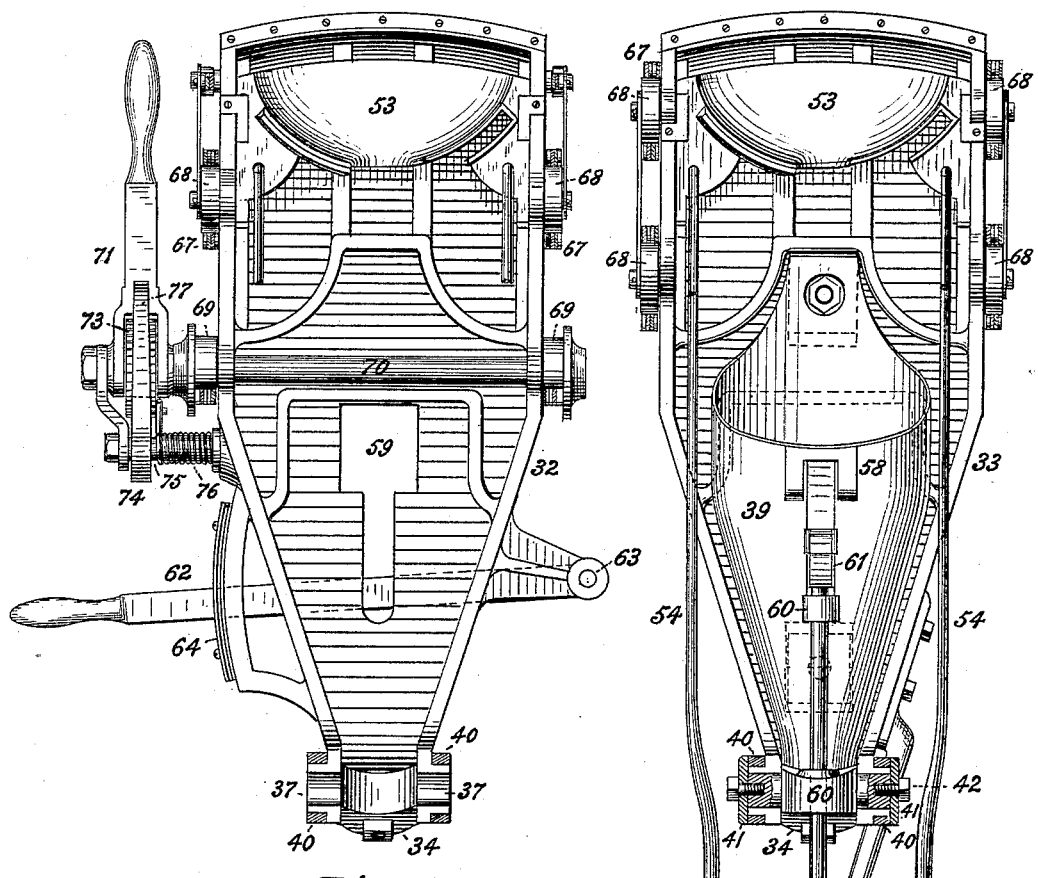

In the accompanying drawings, which make part of this specification, Figure 1, Sheet 1, is a view in perspective of a broom-sewing machine embodying my invention; Fig. 2, Sheet 2, a vertical section through the same with the broom-clamping vise removed; Fig. 3, a view in perspective of the mechanism for varying the length of the stitch; Fig. 4, a longitudinal section at the center of the countershaft of the feed mechanism; Fig. 5, a face view of the feed-pawl; Fig. 6, a side view of said pawl and its carrier; Fig. 7, a longitudinal section through one of the vise-centering bars; Fig. 8, Sheet 3, a view, partly in elevation and partly in section, and on an enlarged scale, of one of the main or outer jaws of the vise, as seen from the inside; Fig. 9, a similar view of the opposite jaw and broom-handle guide-piece; Fig. 10, a view in elevation of the segments of the adjustable lever-rack detached; Fig. 11, Sheet 4, a transverse section through the broom-clamping vise; Fig. 11ª, a view in elevation of the locking-lever of the vise-jaws and its accessories; Fig. 12, a view in perspective of the broom-handle guide-piece; Figs. 13 and 14, similar views of the inner jaws of the broom-clamping vise detached; Fig. 15, Sheet 5, a transverse section through the needle-carrier; Fig. 16, a view in perspective of the needle-box; Fig. 17, a view in elevation of the guide-socket of the threading-rods; Fig. 18, a transverse section through the same; Fig. 19, a view in perspective of the loop-head of the threading-rods; Fig. 20, an end view of the same; Fig. 21, a view in elevation of the adjustable section of one of the twin disks carrying the unthreading-arms; Fig. 22, a longitudinal section through one of the twin disks and the bearing of the rockshaft thereof; Fig. 23, a view in elevation of one of the cam-arms for actuating the unthreading-arms; Fig. 24, Sheet 6, a partial end view in elevation of the machine as seen from the left; Fig. 25, a view in elevation and on an enlarged scale showing the gearing for operating the threading-rods; Fig. 26, a longitudinal section on an enlarged scale through the outer end of one of the unthreading-arms; Fig. 27, a section through the frame of the machine, showing the attachment of the chain 79, and Fig. 28 a view in elevation of the segment 28.

My present invention relates to improvements in broom-sewing machines of the class which is exemplified in Letters Patent of the United States No. 208,407, granted and issued to me under date of September 24, 1878, and in Letters Patent No. 238,140, to myself and Charles Rogers, dated February 22, 1881.

The object of my invention is to attain increased efficiency in the operation of a machine of such general character; and my improvements consist in certain novel devices and combinations of mechanism, including means for locating and maintaining the broom-clamping vise centrally between the needle, irrespective of variations in the thickness of the brooms operated on; raising and lowering the vise as required to insure its proper position relatively to the path of the needles; adjusting the inclination of the needles relatively to the vise; actuating and adjusting the unthreading-arms; maintaining uniform pressure against the jaws of the vise for different thicknesses of broom; locking the vise-carriage in position for work and bringing the vise into vertical position for the insertion and removal of the broom; effecting the adjustment of the inner jaws of the vise for different spacing between seams; hinging the jaws of the vise so as to more firmly clamp the broom at the line of stitching; independently supporting the inner jaws and effecting their ready release; maintaining engagement of the feed-gear of the vise under uniform pressure for different thicknesses of brooms; supporting the broom in vertical position and admitting transverse play of the vise required by the thickness of the broom; supporting the shaft of the gear by which the feeding movement of the vise is effected in a swiveling bearing; effecting the adjustment of the degree of friction on the threading-rods; providing for the attachment and removal of the threading-loop; maintaining the needle-block centrally in its guides and more effectually lubricating the same; releasing the jaws of the vise to effect the opening thereof, and automatically varying the length of the stitch.

The improvements claimed are hereinafter fully set forth.

In the operation of a broom-sewing machine constructed in accordance with my present invention the broom is clamped between the jaws of a vise which is coupled to a carriage adapted to be moved toward and from a pair of reciprocating needles located on opposite sides of the vise, and the vise receives an intermittent feed movement about its pivot on the carriage by which the broom is successively advanced to be penetrated alternately by the needles in the formation of the stitches, for which proper threading and unthreading mechanism is provided for each of the needles. In these general particulars my present machine accords in operative principle with that set forth in Letters Patent No. 238,140 before referred to, and embodies sundry constructive features thereof, which, not constituting *per se* part of my present invention, need not be herein described.

The improvements comprehended within my present invention will now be severally and at length described.

The operative mechanism is mounted and supported upon a frame, which is preferably of metal, and is shown as composed of a pair of standards or skeleton-frame pieces, 1, an upper table, 2, in which there is formed a slot or recess, 3, for the entrance of the broom-clamping vise, and a lower connecting-plate, 4.

The power by which the machine is operated is imparted through a belt passing around a pulley on a shaft rotated by a suitable prime mover, and around a pulley, 5, mounted loosely on a driving-shaft, 6, journaled in bearings on the frame-pieces 1, so as to be movable longitudinally on said shaft. The pulley 5 is bored out conically or tapering on its inner surface in correspondence with the face of a pulley, 7, which is fixed upon the driving-shaft, and when moved into frictional contact with the pulley 7 thereby effects the rotation of said pulley and of the driving-shaft. A bell-crank-shipping lever, 8, which is pivoted to a standard, 9, on the frame, carries upon the end of its upwardly-extending arm a forked clutch, which engages an annular groove in the hub of the shifting-pulley 5, and its opposite arm is coupled by a rod, 10, to a treadle, 11, pivoted to a support, 12, fixed upon the floor or foundation upon which the machine rests. By the depression of the treadle 11 by the foot of the operator the connected shipping-lever 8 forces the pulley 5 into frictional contact with the pulley 7, and upon the release of the treadle a spring, 13, bearing against a collar on the rod 10 and a stop on the frame of the machine, moves the shipping-lever in the opposite direction, and thereby moves the pulley 5 out of contact with the pulley 7. A brake-arm, 14, having a brake-shoe, 15, secured upon its free end in position to bear against the face of the fast pulley 7, is journaled freely upon a horizontal rock-shaft, 16, mounted in bearings 17 on the lower frame-plate, 4, the free end of the brake-arm resting upon the horizontal arm of the shipping-lever 8. The downward movement of said arm in moving the pulley 5 into frictional contact with the pulley 7 permits the brake-arm to fall by its own gravity, releasing the brake-shoe 15 from the pulley 7, and the elevation of the shipping-lever arm in throwing the pulley 5 out of contact simultaneously applies the brake-shoe to the pulley 7 and effects the immediate stoppage of the driving-shaft. Movement is imparted from the driving-shaft to, first, a feed mechanism for moving the broom-clamping vise about a pivotal connection with its carriage to present different portions of the broom successively to the action of the needles; second, a pair of vibrating arms, which actuate, through suitable connections, a pair of needles and a pair of unthreading-arms; and, third, two pair of threading-rods—one pair for each needle—provided with loops and rings for carrying and presenting the thread to the needles.

The details of construction of the several mechanisms so far as my present invention relates thereto are hereinafter set forth. The sliding block or carriage 18 of the broom-clamping vise is mounted upon horizontal guides or ways 19, fixed upon one of the frame-pieces 1, and is movable longitudinally thereon in a plane perpendicular to the driving-shaft 6. The carriage is shown in Figs. 1 and 2 as at the outer extremity of its traverse, being the position which it occupies during the insertion and removal of the broom, and its traverse into and out of position for holding the broom while the stitching thereof is being performed—to wit, at the inner end of the guides—is effected by a hand-lever, 20, pivoted at its inner end to a bracket, 21, on the frame, and coupled near its outer end to one end of a link, 22, the opposite end of which is connected to the carriage 18. Under my prior constructions no range of vertical movement was provided for the carriage and vise, and I have found vertical adjustability to be desirable, in order that the points of the needles may pass under the binder and as closely as possible to the tops of the outer vise-jaws without striking or bearing thereon in operating on the different thicknesses of brooms. To this end a pair of wedge-blocks, 23 44, Fig. 2, are interposed between the carriage 18 and guides 19, the bearing-surfaces of said wedge-blocks on the guides being flat and on the carriage being upwardly inclined toward the inner end thereof. The inner ends of the wedge-blocks 23 24 are coupled to the opposite ends of an equalizing-lever, 25, which is pivoted at its center to a horizontal bar, 26, connected adjustably, as by bolts passing through slotted holes, to the inner side of the carriage. Movement of the upper wedge-block, 23, in one direction consequently effects a coincident and equal movement of the lower block, 24, in the opposite direction, and the horizontality and equal bearing of the carriage upon both guides is maintained irrespective of the degree of elevation that may be imparted to the carriage. The upper wedge-block is coupled to the carriage by a pin, 81, on the latter, passing through a slot, 82, on the wedge-block, the length of said slot governing the longitudinal traverse of the carriage upon the wedge block. The movement of the carriage upon the wedge-blocks is effected by the contact of a series of teeth or serrations, 27, on the inner end of the upper wedge-block with corresponding teeth on a segment, 28, which is pivoted by a pin, 29, to the frame, and coupled by a rod, 30, to an arm, 31, on the horizontal shaft 16, the rod 30 being connected to a stud passing through a slot in the segment 28, (see Fig. 28,) so as to enable the position of the segment to be readily adjusted as required. The greater or less range of vibration of the segment 28 about its pivot, as effected by the movements of the rock-shaft, will, by the corresponding variation of its angle to the teeth of the wedge-block 23, impart a greater or less range of movement to the carriage upon the wedge-blocks and of resultant elevation to the carriage and vise by sooner or later arresting the movement of the wedge-blocks, the movement of the rock-shaft being effected and governed as presently to be described.

The vise or clamp within which the broom is secured and held during the formation of the seam or seams of stitches is illustrated in detail in Figs. 8 to 14, inclusive. Two box or case shaped main or outer jaws, 32 33, each of which is curved or rounded at its upper end, both transversely and longitudinally, (the curvature of the jaws, in the latter particular, being substantially in correspondence with the curve desired for the seam of the broom,) are secured at their lower ends to what I term "shelf-hinge" plates 34, the connection being effected by bolts 35, passing through outwardly and downwardly projecting flanges on the jaws 32 33, and through slotted holes 36 in the shelf-hinge plates 34, so that the jaws may be adjusted and secured in position at greater or less distance, as desired, from the abutting faces of the plates 34. Each of said plates 34, which serves to form one section of a hinge for the jaws 32 33, is provided with a semi-cylindrical recess, 37, at each of its ends, said recesses forming, when the plates are brought together, or nearly so, bearings for a pair of trunnions, 38, formed on the lower end of a vertical broom-guide or funnel-piece, 39, which is adapted to fit between the jaws 32 33, and has a central opening adapted to fit the broom-handle at and adjacent to its lower end. The hinge-plates are connected one to the other by rings 40, which fit freely around the trunnion-bearings, and are held in position longitudinally upon the bearings by cap-plates 41, secured to the trunnions by central bolts, 42. By the above construction a hinge connection is provided for the lower ends of the jaws, in which each of the jaws is movable toward and from a central plane, while the adjustability of the jaws upon the shelf-hinge plates enables their upper ends to be maintained in proper position to firmly clamp the broom at the line on which the seam is to be formed.

The pivotal connection of the broom-clamping vise with its carriage 18 is effected through the funnel-piece 39, which is provided with a projecting socket, 43, near its lower end, which passes freely through an opening in the adjacent main jaw, 33, and fits around a pivot, 44, on the carriage 18. The vise is guided and supported in its traverse about the pivot 44 by a bolt, 45, which passes freely through a segmental slot, 46, formed in an upward extension of the carriage 18, and through a socket, 47, projecting from the upper end of the funnel-piece 39 through an opening in the adjacent vise-jaw 33, the bolt being secured to the funnel-piece by a nut, 48, bearing against the inner end of the socket 47. The connection of the vise and carriage is thereby properly maintained, while admitting of free movement of the jaws about the axial line of the hinge-trunnions. A tenon or guide projection, 58, on the funnel-piece 39, fits freely in a mortise, 59, in the jaw 32, and serves to prevent canting or binding of the jaws on their trunnions in the opening and closing of the vise. Movement about the pivot 44 is imparted to the vise by a worm, 49, secured upon a shaft, 50, and meshing with a worm-wheel segment, 51, fixed to the outside of the socket 47 of the funnel-piece 39, rotation being imparted to the worm-shaft 50 by feed mechanism to be hereinafter described.

As in Letters Patent No. 238,140, the broom is clamped between a pair of inner or auxiliary jaws located between the main jaws of the vise, and serving as a mold or former to give proper shape to the broom and hold it firmly while being moved vertically relatively to the main jaws for sewing two or more different seams. The auxiliary jaws 53 are, under my present invention, secured at each end to a spring-rod, 54, the two opposite spring-rods at each end of the vise being united into a common rod, 55, adjacent to the bottom of the vise. The jaws 53 bear, on their outer faces, against the inner sides of the main jaws 32 33 and the elasticity of the rods 54 admits of their movement toward and from the central plane of the vise in clamping and releasing the broom. The rods 55 are secured at their lower ends to a horizontal plate, 56, to the center of which is secured a vertical rod, 57, which passes through guide-sockets 60 on the funnel-piece 39. An arm, 61, fixed upon the upper end of the rod 57 rests upon a supporting and adjusting lever, 62, pivoted to the jaw 32 by a pin, 63, said lever serving to support the auxiliary jaws 53, and adjust the vertical position thereof relatively to the main jaws as required to form the several seams. The lever 62 is maintained in desired position by an adjustable lever rack or support composed of a series of curved plates, 64, provided with teeth or stops 65, adapted to support the lever, and secured one above the other to the jaw 32. Slots 66 are formed in the two outer plates for the passage of the bolts by which the same are connected to the jaw, so that the distance between the stops 65 and consequent drop of the inner jaws in the traverse of the lever from one to another may be readily adjusted as desired in accordance with the distance between the seams. By independently supporting the inner jaws upon the lever, as above described, I am enabled to release the lever while a seam is being sewed, and thereby to economize time in operation by dropping the auxiliary jaws into proper position for the sewing of the next seam immediately upon the opening of the main jaws.

The closing of the jaws is effected, as in Letters Patent No. 238,140, by chains 67, connected at their upper ends to studs on the jaw 32, and passing around loose pulleys 68 on the jaws 32 33 to connections with winding-drums 69 on a clamping-shaft, 70, journaled in bearings on the jaw 32. The shaft 70 is rotated to close the jaws by the bearing of the chain in tightening on the pulleys 68 by a ratchet-lever, 71, mounted loosely on the shaft 70, and carrying a driving-pawl, 72, which engages the teeth of a ratchet-wheel, 73, fixed on the shaft 70. The jaws 32 33 are locked, when closed, by a retaining-pawl, 74, journaled on a stud, 75, on the jaw 32, and held in contact with the teeth of the ratchet-wheel 73 by a spring, 76.

To enable the retaining-pawl to be readily tripped for releasing the jaws, it is provided with an upwardly-extending tail-piece, 77. By releasing the driving-pawl from the ratchet-wheel and moving the pawl-lever 71 into contact with the tail-piece 77 the retaining pawl 74 is drawn out of engagement with the ratchet-wheel, and the jaws are relaxed from the tension of the chain to permit the removal of the finished broom.

The vise-carriage is locked in position for the operation of the needles upon the broom, and the vise brought truly into vertical position when the carriage is drawn to the outer extremity of its guides, by the following means: A downwardly-projecting arm or tail piece, 78, secured to the jaw 33, is coupled by a chain or cord, 79, to a hook passing through the lower portion of the frame, on the side adjacent to the driving shaft, said hook being adjustable by a temper-screw or otherwise, to admit of variation in the traverse permitted by the chain which governs the position of the lower end of the vise when the carriage is drawn to the outer extremity of the guides. The traverse of the upper end of the vise is limited by a stop, 80, secured to the table 2 in position to abut against a projection, 52, secured to the outside of the worm-segment 51 of the funnel-piece 39.

As before stated, the vise-carriage 18 is connected by a link, 22, with a hand-lever, 20, pivoted to the frame, and by swinging said lever to the left of Fig. 2 upon its pivot 21 the carriage and attached vise are moved into working position, and are locked therein by the link 22 and lever 20, which then stand in line horizontally or slightly inclined one to the other below a horizontal plane, so that the pivot 21 of the hand-lever acts as an abutment to resist outward movement of the carriage until the same is withdrawn by the operator by moving the hand-lever into the position shown in Figs. 1 and 2. Upon arriving at such position the top of the vise is arrested by the contact of the projection 52 with the stop 80, and the bottom by the tightening of the chain 79, the vise being thereby caused to assume a truly vertical position, as is desirable for the removal of the finished broom and the insertion of the broom which is next to be operated on.

Inasmuch as the thickness of the brooms upon which the machine is required to operate will be subject to frequent variations from time to time, it becomes of special importance to provide for insuring the adjustment and maintenance of the jaws of the vise at equal distances from a vertical plane passing through the intersection of the paths of the needles for exerting a uniform clamping-pressure against the jaws of the vise and for varying the length of the stitches in conformity with the variations in thickness of the brooms. These results are attained by centering devices and a feed mechanism regulated thereby, as now to be described.

The centering of the vise is effected by the movement of two centering-bars, 83, which are fitted to slide in guides 84 on the table 2, perpendicularly to and on opposite sides of the slot 3, through which the top of the vise passes, said bars bearing at their inner ends against the sides of the jaws 32 33, near the tops thereof. Each of the bars 83 is slotted to receive a spring, 86, which bears at one end against an abutment, 85, fixed upon the guide 84, and at the other end against the bar 83, near its outer end, the tendency of said springs being to move the bars 83 outwardly from the jaws of the vise. Said bars are forced with equal pressure toward the jaws of the vise, so as to adjust and maintain the vise in the required vertical central plane by a pair of wedges, 87, secured upon the upper ends of vertical rods 88, and passing through the bars 83, said wedges bearing on their straight sides against the adjacent sides of the abutments 85, and against bearing-faces in line with said abutments on the inside of boxes 90, projecting above the guides 84, and on their inclined sides against the bars 83. The arms 88 are coupled at their lower ends to arms 89, secured upon the horizontal rock-shaft 16, by the partial rotation of which in its bearings the greater or less elevation of the wedges 87 in accordance with thickness of the broom is effected. The shaft 16 is rocked in its bearings during the inward traverse of the carriage 18 in bringing the broom-clamping vise into position for the operation of the needles to be effected by the contact of an arm, 91, on the carriage 18 with a lever, 92, which is mounted loosely on the shaft 16, so as to be capable of a limited range of movement independently of said shaft. The lever 92 rests near its lower end against a post, 93, secured to the shaft 16, and a chain or cord, 94, secured at its upper end to the lever 92, passes around frictional surfaces 95 96 on the post 93, and around a pulley, 97, journaled on the frame of the machine to a weight, 98, which is suspended from its lower end. A spring of suitable tension may, if desired, be substituted for the weight 98. The frictional contact of the chain 94 with the post 93 causes the lever 92 to carry with it on its inward movement the post 93, and thereby to effect a corresponding partial rotation of the shaft 16, which, through the arms 89 and rods 88, effects the elevation of the wedges 87, and through said wedges brings the centering-bars 83 to the requisite bearing upon the vise-jaws 32 33, while the loose connection of the lever 92 and shaft 16 prevents strain or breakage of the parts by admitting of such independent further movement of the lever 92 as may be required by the traverse of the carriage 18 after the centering-bars have been brought to bear upon the vise-jaws.

As before stated, the intermittent feed movement of the vise on its pivot upon the carriage is effected by the engagement of a worm, 49, on a worm-shaft, 50, with a worm-segment, 51, on the funnel-piece 39. The worm-shaft 50 is supported at one end in a bearing, 99, which is journaled on a feed-shaft, 100, mounted in bearings 101, secured to the lower side of the table 2, and at its opposite end in a bearing, 102, having a lateral stem or journal fitting in a socket, 103, secured to the upper end of a vertical rod, 104, which is coupled to a lever, 105, pivoted to the frame and serving to engage and disengage the worm 49 and segment 51 by imparting downward or upward movement, respectively, to the rod 104. The lever 105 is shown in Fig. 3, and in dotted lines in Fig. 2, and is moved as required by the operator. Said rod carries on its lower end a weight, 106, by which a proper bearing of the worm 49 is maintained upon the segment 51 when the worm is lowered into engagement therewith by the movement of the lever 105. The swiveling support of the worm-shaft bearing 102, by its lateral pin and socket 103, enables the worm to accurately adjust itself relatively to the segment which it actuates. The worm-shaft 50 is intermittently rotated during the operation of the needles to effect the feed of the broom thereto by a bevel-gear, 107, on the feed-shaft 100, which engages a corresponding pinion, 108, on the worm-shaft. Movement is imparted to the feed-shaft 100 by a vibrating bell-crank lever, 109, mounted on a stud on the frame of the machine, and having on its lower arm a roller, 110, which engages a cam-groove, 111, on the fast pulley 7, and on its upper arm a toothed segment, 112, engaging a segmental gear, 113, fixed upon a sleeve or carrier, 114, which is mounted loosely on the feed-shaft 100, and is provided with an arm, 115, to which is pivoted a feed-pawl, 116, engaging the teeth of a ratchet-wheel, 117, fixed upon the feed-shaft. The cam-groove 111 is formed with two acting portions substantially parallel with a diameter of the pulley 7, and two inactive portions curved concentrically with the shaft 6, on which said pulley is mounted. The bell-crank lever 109 will therefore be vibrated twice in each revolution of the shaft 6—that is to say, during the traverse of the roller 110 through the acting portions of the cam-groove 111—and will be at rest twice in each revolution—that is, during the passage of the roller through the inactive portions of the cam-groove. The feed-pawl 116 will therefore be moved once in each revolution to effect the feed of the broom-carrying vise for one needle, and one for the other, and the broom-carrying vise will have a period of rest after each movement of the feed-pawl, to admit of the traverse of the needle for which the preceding feed movement has been effected. The feed-pawl is held in engagement with the teeth of the ratchet-wheel by a spring, 118, and backward movement of the ratchet-wheel and feed-shaft is prevented by a detent-pawl, 119.

It will be obvious that the degree of axial movement imparted to the feed-shaft at each vibration of the bell-crank lever 109 in the direction proper to cause the feed-pawl 116 to actuate the ratchet-wheel, and consequently the degree of traverse imparted through the worm-shaft to the broom-clamping vise, which regulates the length of the stitch, will be proportionate to the duration of the engagement of the feed-pawl with the ratchet-wheel in such vibration. To provide for effecting such regulation of the length of the stitch in accordance with the thickness of the broom, the period of engagement of the pawl and ratchet-wheel in each alternate vibration of the bell-crank lever is governed by the position of the lower rock-shaft, 16, which, as hereinbefore explained, is adjusted axially by the position of the centering wedges and bars, determined by the thickness of the broom. The mechanism employed for this purpose is as follows: A shield or cam, 120, the periphery of which is formed partly of a radius greater than that of the ratchet-wheel 117, and partly of a radius less than the distance from the center of said ratchet-wheel to the bottom of its teeth, the surfaces of the periphery of said cam nearer to and farther from its center being connected by a curved or inclined surface, is fitted loosely upon the feed-shaft 100, adjacent to the ratchet-wheel 117, and is secured to the hub of a segmental gear, 121, also loose upon the feed-shaft. An internally-toothed segment, 122, formed upon an arm, 123, fixed upon a rock-shaft, 124, which is mounted in bearings below and adjacent to the feed-shaft, engages the teeth of the segment 121, and in the vibration of the rock-shaft 124 moves the cam 120 axially upon the feed-shaft relatively to the initial position of the feed-pawl 116. Said pawl is widened at its free end, as shown in Figs. 5 and 6, so as to project over the face of the cam 120, and during such portion of its traverse with its driving-segment 113, as it passes over the higher portion of the periphery of the cam, it is held thereby out of engagement with the teeth of the ratchet-wheel 117, and imparts no movement to the feed-shaft, and on passing from the higher to the lower portion of the cam its spring causes it to engage the teeth of the ratchet-wheel, and it rotates the same and the feed-shaft during the remainder of its traverse, the proportion of its throw during which it acts to move said shaft being, consequently, dependent upon the adjusted position of the cam through the segmental gears 121 122 and rock-shaft 124. Such adjustment is effected by an arm, 125, secured upon the rock-shaft 124, and coupled by a rod, 126, with the arm 31 of the lower rock-shaft, 16. The movement of the arm 125 and resultant adjustment of position of the cam 120 will consequently be effected by and in correspondence with the adjustment of the rock-shaft 16 by the centering wedges and bars before described, and such adjustment of the cam 120 will be made but once for the entire seam in proper correspondence with the thickness of the broom, while the feed-pawl 116 will be moved as required twice in each revolution through its adjusted range of traverse. The sliding blocks or carriers 127, to which the boxes 128 of the needles 129 are connected, are, as in Letters Patent No. 238,140 aforesaid, reciprocated by vibrating arms 130, journaled in bearings 131 upon the frame, and actuated by the pins 132 of crank-disks 133, which are rotated, through intermediate gearing, from the driving-shaft 6, said crank-pins fitting boxes 134, which slide in slots 135 in the arms 130. The needle-carriers 127 are coupled by links 179 to the vibrating arms 130, and slide in ways or needle-races composed of upper guide-bars, 135ª, and lower guide-bars, 136, connected by end bolts, 137, passing through blocks or distance-pieces 138.

In order to insure the proper centering of the carriers in taking up lost motion by adjustments of the guide-bars, as well as to more effectually retain oil supplied to the wearing-surfaces, the upper guides, 135ª, are formed V-shaped in cross-section on their lower faces, and a corresponding V-shaped recess is formed in each of the lower guides, the carriers being fitted thereto by being each provided with a V-shaped tongue, 139, on its lower face, and a corresponding V-shaped recess, 140, on its upper face, as seen in the transverse section, Fig. 15.

It is desirable for proper operation that the needles shall traverse as closely as possible to the tops of the vise-jaws without involving wear and strain by bearing unduly thereon, and in order to enable the angle of the needles to be accurately adjusted, I provide a pivotal connection of the needle-boxes 128 with their carriers 127. To this end a pivot, 141, formed upon the side of the box 128, at or near its center, is fitted to a corresponding socket in the carrier 127, and the box and carrier are connected by bolts 142, which pass through vertically-slotted holes in the carrier and engage bosses 143 on the needle-box, which abut against the adjacent side of the carrier. By slackening the bolts 142 the needle-box may be adjusted on its pivot to raise or lower the point of the needle as required, the slots in the carrier affording the requisite range of upward and downward movement, respectively, to the connecting-bolts 142, which, on being brought to a tight bearing, hold the needle-box firmly in its adjusted position. The threading-rods 144 145 are, as in Letters Patent No. 238,140, actuated by vibrating levers 146, pivoted to the frame, the lower ends of said levers being provided with rollers engaging grooves 147 in cams 148, fixed upon the driving-shaft 6, their upper ends being coupled by rods 149 to segmental gears 151, fixed upon rock-shafts 150, said segmental gears 151 engaging pinions 180 on the shafts of crank-disks 152, by which the guide-rods 153 154 of the threading-rods 144 145 are reciprocated. The main or guide rods 153 154 of the threading-rods 144 145 slide, under different degrees of friction, respectively, through a guide-block, 155, which is pivoted by a pin, 156, to a post, 157, on the table 2.

To enable the rod 153 to be held stationary in the guide-block during a portion of the traverse of the rod 154, so that an open space may be left for the free end of the twine, I provide a friction device, which is shown in Figs. 17 and 18. A divided clamp, 160, formed of two sections, each recessed on its inner face to the radius of the rod 153, is fitted in a transverse recess in the guide-block 155, and a bow or U-shaped spring, 161, passes through the top of the recess in the guide-block, with its ends extending downwardly adjacent to the sides of the clamp 160. Set-screws 162, engaging female threads in the ends of the spring 161, bear against the sides of the clamp 160, and by tightening or slackening said screws the friction of the clamp 160 upon the rod 153 may be readily increased or diminished, as desired. The rod 153 is, as in Letters Patent No. 238,140, provided with two stops or collars, one on each side of an arm by which it is connected to the rod 154, (see Fig. 25,) said arm sliding freely on the rod 153 for the distance between one of its faces and the adjacent collar, so that the rod 153, being held by the friction device above described, remains stationary during the corresponding portion of the traverse of the rod 154.

As heretofore constructed, the threaded loop 158 has been permanently connected to its rod, as by being brazed thereto, and when worn or broken involved the loss of the head and rod to which it is attached. Under my present invention the loop 158 is connected to the rod 144 by having its ends clamped between a fixed head, 163, on the rod and a removable jaw, 164, which is secured to the head 163 by a set-screw, 165. It is thereby firmly held in position, and may be readily inserted and removed so as to be replaced by another when required without necessitating renewal of any of the other parts.

The unthreading-arms 166, each of which carries upon its outer end a sheave, 181, for engaging the tension end of the twine and thereby unthreading the needle, are secured by set-screws 167 in sockets 168, formed upon socket-plates 169, which are secured by bolts 170 to disks 171, fixed upon rock-shafts 172, journaled in bearings 173 on the frame.

To enable the position of the sheaves of the unthreading-arms to be readily adjusted as required relatively to the path of the needles, the bolts 170, which connect the socket-plates 169 to their supporting-disks 171, are passed through slots 174 in the socket-plates, said slots being curved concentrically with the axes of the rock-shafts 172, which carry the supporting-disks 171. The socket-plates may consequently be moved about the axes of the rock-shafts and fixed to their supporting-disks in such position as may be required to effect the desired location of the sheaves of the unthreading-arms relatively to the needles.

In lieu of actuating the unthreading-arms by sliding blocks coupled to the vibrating arms 130, which reciprocate the needles, as in Letters Patent No. 238,140, I provide for reducing friction and imparting a greater degree of traverse to the unthreading-arms by effecting the vibration of the rock-shafts 172 through cam-arms 175, fixed upon opposite ends of the rock-shafts 172 to the disks 171, said arms being provided with cam-grooves 176, which are engaged by friction-rollers 178, journaled on pins 177 on the needle-operating arms 130. The cam-slots 176 are curved concentrically with the paths of the pins 177 for a portion of their length, and curved in the opposite direction for the remainder thereof, their traverse and that of the connected rock-shafts and unthreading-arms being thereby effected during the passage of the rollers 178 through the portions of the cam-grooves which are of opposite curvature to the lines of traverse of their pins 177.

The features of improvement hereinbefore described are advantageously applicable to conjoined operation in broom-sewing machines according in structural and operative principle with that illustrated in the drawings; and, further, a greater or less proportion thereof may be embodied severally in machines of such character, as well as in others differing in sundry particulars therefrom.

In the operation of the machine the handle of the broom is inserted in the funnel-piece 39, and the shoulder or waist of the broom is clamped between the auxiliary jaws 53 by the chains 67, winding-drums 69, clamping-shaft 70, and ratchet-lever 71. The vise-carriage 18 is then pushed along its guides 19 to the inner extremity of its traverse, and locked in such position by the hand-lever 20 and link 22. The broom-vise is then moved by the operator upon its pivot on the carriage into proper position for the entrance of one of the needles in forming the first stitch, commencing at the edge of the broom nearest the operator, and the free end of the twine is placed in the threading-ring 159 on the side of the broom opposite to that on which the needle first enters. Rotation is then imparted to the driving-shaft by means of the treadle 11 and connected shipping-lever 8, such rotation effecting the movement of the vibrating arms 130, and through said arms reciprocating the sliding carriers 127, needle-boxes 128, and needles 129. The needle which first passes through the broom passes first through the threading-ring 159 on the side of the broom at which it enters, and passing through the broom, entering under the binder, and passing out over the binder is threaded by threading-loop 158 and threading-ring 159 on the side of the broom opposite that at which it enters, as in Letters Patent No. 238,140, and on its return-stroke passes through the broom, carrying the thread with it. Before the termination of its return-stroke its unthreading-arm 166 has been vibrated through the cam-arm 175 until the sheave 181 on its outer end engages the tension end of the thread and withdraws it from the needle, and at the same time draws it out of the broom, leaving it in the threading-ring of the needle which has just completed the stitch. The opposite needle then passes through the broom and is threaded and unthreaded in a similar manner, and the vise being fed forward by the movements of the bell-crank lever 109 and its connected feed mechanism the operations are repeated until the seam is completed, the method of forming the stitch and the stitch itself being similar to those set forth in Patent No. 238,140. The operator then arrests the rotation of the driving-shaft, draws the vise-carriage back to its initial position, releases the jaws, and withdraws the completed broom.

I claim herein as my invention—

1. In a broom-sewing machine, the combination of a pair of hinged main or outer vise-jaws, a pair of auxiliary jaws located between said main jaws and adapted to be clamped upon a broom by the closing thereof, and a lever pivoted to one of said main jaws and supporting the auxiliary jaws, these members being combined for joint operation to admit of the lowering of the auxiliary jaws coincidently with the slackening of the main jaws by the prior movement of the supporting-lever, substantially as set forth.

2. In a broom-sewing machine, the combination of a pair of hinged main or outer vise-jaws, a pair of auxiliary jaws located between said main jaws, a lever pivoted to one of said main jaws and supporting the auxiliary jaws, and an adjustable lever-rack or series of catches fixed upon the main jaw, which carries the supporting-lever, and adapted to retain said lever in different vertical planes, substantially as set forth.

3. In a broom-sewing machine, the combination of a vise-jaw, a lever pivoted to one end thereof, and an adjustable lever-rack composed of a series of plates secured one above the other to the opposite end of the jaw, said plates being provided with lateral teeth or projections, and (except the one nearest the jaw) having longitudinal slots for the passage of the bolts by which they are connected to the jaw, substantially as set forth.

4. In a broom-sewing machine, the combination of a pair of vise-jaws and a pair of shelf-hinge plates connected adjustably to lugs or flanges on the jaws, said plates being recessed on their adjacent faces to serve as bearings for a pair of hinge pins or trunnions, upon which the vise-jaws are pivoted one to the other, substantially as set forth.

5. In a broom-sewing machine, the combination of a pair of vise-jaws having hinge-plates provided with sockets or bearings on their lower ends, a broom-guide or funnel-piece located between said jaws and having trunnions fitting the bearings thereof, and a vise-supporting carriage upon which said funnel-piece is pivoted in a plane perpendicular to the axis of the trunnions, substantially as set forth.

6. In a broom-sewing machine, the combination of a pair of vise-jaws having hinge sockets or bearings on their lower ends, a broom-guide or funnel-piece located between said jaws and having trunnions fitting the bearings thereof, a guide piece or tongue projecting from one side of the funnel-piece and fitting a vertical slot or mortise on one of the vise-jaws, a pivot-socket formed on the opposite side of the funnel-piece and projecting through an opening in the adjacent vise-jaw, a supporting-carriage having a pivot fitting in said socket, a guide-bolt passing through a segmental slot on the carriage concentric with said pivot and through an opening in the adjacent vise-jaw and secured to the funnel-piece, and a segmental gear secured to the funnel-piece concentric with said pivot and slot, substantially as set forth.

7. In a broom-sewing machine, the combination of a vise-supporting carriage fitted to slide on ways or guides, a broom-clamping vise the jaws of which are hinged together in a plane parallel with the plane of traverse of said carriage and which is pivoted to the carriage in a plane perpendicular thereto, a pair of centering-bars bearing against the jaws of the vise near their free ends, a pair of centering-wedges bearing against fixed abutments and against said centering-bars, and a rock-shaft adapted to be vibrated in its bearings by the supporting-carriage and having arms coupled to the rods which carry the centering-wedges, these members being combined for joint operation to effect the clamping of the vise-jaws with uniform pressure and at equal distances from a central plane upon brooms of different thicknesses, substantially as set forth.

8. In a broom-sewing machine, the combination of a vise-supporting carriage fitted to slide on ways or guides, a broom-clamping vise pivoted to said carriage, a rock-shaft adapted to be vibrated in its bearings by said carriage in the traverse thereof and to actuate mechanism, substantially as described, for clamping the jaws of the vise uniformly and at equal distances from a central plane upon a broom within the same, gearing by which intermittent movement is imparted from a feed-shaft to the vise about its pivot on the carriage, a pawl mounted freely on the feed-shaft and engaging a ratchet-wheel thereon, and a cam fitting on said feed-shaft and adjusted in position thereon by the movement of the rock-shaft, said cam being adapted to vary the period of engagement of the pawl and ratchet and thereby to vary the length of the feeding movements of the vise in accordance with the thickness of the broom which is operated on, substantially as set forth.

9. In a broom-sewing machine, the combination of a vise-supporting carriage and a broom-holding vise pivoted thereto, a pair of horizontal guides or ways, a pair of wedge-blocks interposed between the faces of said guides and the carriage, one of said wedge-blocks having an inclined series of end teeth and being coupled to the carriage by a connection admitting of independent longitudinal movement of the carriage relatively to the wedge-block, an equalizing-lever pivoted at its center to the carriage and coupled at its ends to the wedge-blocks, a rock-shaft adapted to be vibrated in its bearings by the carriage in the traverse thereof, and a pivoted segment coupled to and adjusted in position by the rock-shaft, said segment having a series of teeth adapted to act as abutments to the end teeth of the wedge block and arrest the longitudinal movement thereof upon its guide, substantially as set forth.

10. In a broom-sewing machine, the combination of a vise-supporting carriage fitted to slide on ways or guides, a broom-holding vise pivoted to said carriage, a rock-shaft mounted in bearings transversely to the line of traverse of the carriage, mechanism, substantially as described, actuated by said rock-shaft for clamping the vise-jaws upon a broom with uniform pressure and at equal distances from a central plane, and a lever mounted loosely on said rock-shaft and held by frictional contact to an arm or post thereon, said lever being adapted to be moved about the axial line of the rock-shaft by an arm on the carriage in the traverse thereof, substantially as set forth.

11. In a broom-sewing machine, the combination of a vise-supporting carriage fitted to slide on ways or guides, a broom-holding vise pivoted to said carriage, a link coupling said carriage to a hand-lever pivoted to the frame of the machine, a stop fixed to the frame and adapted to abut against a stop on the vise adjacent to its top, and a chain or cord connected to the lower end of the vise and to the frame, substantially as set forth.

12. In a broom-sewing machine, the combination of a pair of hinged vise-jaws, clamping-chains secured to one of said jaws and passing around pulleys on the jaws to winding-drums on a shaft mounted in bearings on the jaw to which they are secured, a clamping-lever mounted loosely on said shaft and carrying a pivoted driving-pawl engaging the teeth of a ratchet-wheel fixed thereon, and a detent-pawl pivoted on a fixed stud and engaging the teeth of the ratchet-wheel, said pawl having a projecting tail-piece adapted to be moved outwardly when pressed upon by the clamping-lever and thereby release the detent-pawl from the ratchet-lever for relaxing the vise-jaws, substantially as set forth.

13. In a broom-sewing machine, the combination of a needle-race composed of an upper guide-bar having a longitudinal V-shaped tenon or projection on its lower side, a lower guide-bar having a corresponding V-shaped recess on its upper side, end-connecting bolts and distance-pieces, and a needle block or carrier having a recess on its upper side and a tenon on its lower side corresponding, respectively, in transverse section with the tenon and recess of the guide-bars, substantially as set forth.

14. In a broom-sewing machine, the combination of a needle-box having a lateral pivot, a needle block or carrier having a socket fitting said pivot, and bolts passing through slots in the carrier and engaging the needle-block, substantially as set forth.

15. In a broom-sewing machine, the combination of two guide-rods, each carrying a threading-rod, said threading-rods being provided, respectively, with a threading-ring and a threading-loop, and said guide-rods being connected with the capacity of a limited range of independent longitudinal movement, a guide-block pivoted to a fixed standard and fitting freely around the guide-rod of the rod carrying the threading-ring, a divided clamp fitting around the guide-rod of the rod carrying the threading-loop in a recess in the guide-block, a bow or U-shaped spring having its arms adjacent to the outer sides of said clamp, and set-screws bearing on the clamp and engaging the arms of said spring, substantially as set forth.

16. In a broom-sewing machine, the combination of a threading-rod having a loop-head fixed upon its end, a threading-loop fitting between said head and a detachable jaw, and a clamping-screw connecting the head and jaw, substantially as set forth.

17. In a broom-sewing machine, the combination of an unthreading-arm, a plate having a socket in which said arm is fitted and secured, a disk fixed upon an operating rock-shaft, slots formed in the socket-plate and curved concentrically with the axis of the rock-shaft, and bolts passing through said slots and connecting the disk and socket-plate, substantially as set forth.

18. In a broom-sewing machine, the combination of a needle-operating arm adapted to be vibrated about an end bearing, a rock-shaft and an unthreading-arm secured thereto, a grooved cam-arm fixed upon said rock-shaft, and a roller journaled upon the needle-operating arm and fitting in the groove of said cam-arm, substantially as set forth.

19. In a broom-sewing machine, the combination of a vise-supporting carriage, a broom-holding vise pivoted thereto, a worm segment fixed upon the vise concentric with its pivot, a shaft carrying a worm adapted to engage said segment, a bearing journaled upon a shaft or pivot at right angles to said worm-shaft and supporting the end thereof farthest from the worm, a bearing connected to a vertical weighted rod and supporting the opposite end of the worm-shaft, and a lever pivoted to the frame of the machine and coupled to said weighted rod, substantially as set forth.

20. In a broom-sewing machine, the combination of a worm-shaft and a worm fixed thereto, a bearing journaled upon a shaft or pivot at right angles to said worm-shaft and supporting the end thereof farthest from the worm, a bearing provided with a lateral pivot and supporting the opposite end of the worm-shaft, a socket fitting said pivot and secured upon a vertical weighted rod, and a lever pivoted to the frame of the machine and coupled to said weighted rod, substantially as set forth.

21. In a broom-sewing machine, the combination of a reciprocating vise-supporting carriage, a broom-clamping vise pivoted thereto, a pair of centering-bars fitted to slide in guides perpendicularly to the plane of traverse of the carriage and vise and to bear against the outer sides of the vise-jaws, springs bearing against fixed abutments and against said centering-bars and tending to move the centering-bars out of contact with the vise-jaws, centering-wedges bearing against fixed abutments and against said centering-bars and tending to press the centering-bars against the vise, and a rock-shaft adapted to be vibrated by the carriage in its traverse and carrying arms coupled to rods which are secured to the centering-wedges, substantially as set forth.

22. In a broom-sewing machine, the combination of a feed-shaft, a segmental gear fixed upon a sleeve or carrier mounted loosely thereon, a feed-pawl pivoted to said carrier, a bell-crank lever adapted to be vibrated by a cam on a driving-shaft and carrying a segmental gear meshing with the gear of the feed-pawl carrier, a ratchet-wheel fixed upon the feed-shaft and adapted to be engaged by the feed-pawl, a cam mounted loosely on the feed-shaft adjacent to the ratchet-wheel in position to be overhung by the toe of the feed-pawl, the periphery of said cam being partly of greater radius than the feed-pawl and partly of less radius than the distance from the center of the feed-shaft to the bottom of the teeth of the ratchet-wheel, a segmental gear connected to the hub of said cam, and an internally-toothed segment formed upon an arm fixed to an adjusting rock-shaft, said segment engaging the teeth of the segmental gear and acting to vary the axial position of the cam relatively to the initial position of the feed-pawl, substantially as set forth.

In testimony whereof I have hereunto set my hand.

GEORGE F. McCOMBS.

Witnesses:
J. SNOWDEN BELL,
R. H. WHITTLESEY.